(12) United States Patent
Mahadevan

(10) Patent No.: US 6,262,512 B1
(45) Date of Patent: Jul. 17, 2001

(54) THERMALLY ACTUATED MICROELECTROMECHANICAL SYSTEMS INCLUDING THERMAL ISOLATION STRUCTURES

(75) Inventor: Ramaswamy Mahadevan, Chapel Hill, NC (US)

(73) Assignee: JDS Uniphase Inc. (CA)

( * ) Notice: Subject to any disclaimer, the term of this patent is extended or adjusted under 35 U.S.C. 154(b) by 0 days.

(21) Appl. No.: 09/436,939

(22) Filed: Nov. 8, 1999

(51) Int. Cl.$^7$ ................................................. H02N 10/00
(52) U.S. Cl. ................................................. 310/307
(58) Field of Search ............................................. 310/307

(56) References Cited

U.S. PATENT DOCUMENTS

| | | | |
|---|---|---|---|
| 4,691,265 | * 9/1987 | Calver et al. | 361/386 |
| 5,063,434 | * 11/1991 | Emoto | 357/72 |
| 5,307,236 | * 4/1994 | Rio et al. | 361/720 |
| 5,909,078 | 6/1999 | Wood et al. | 310/307 |
| 6,140,646 | * 10/2000 | Busta et al. | 250/332 |

FOREIGN PATENT DOCUMENTS

| | | | |
|---|---|---|---|
| 35 08 659 A1 | * 8/2000 | (DE) | 310/307 |
| 7-326866 | * 12/1995 | (JP) | 310/307 |
| 8-171941 | * 7/1996 | (JP) | 310/307 |
| 8-293401 | * 11/1996 | (JP) | 310/307 |
| 2000-227374 | * 8/2000 | (JP) | 310/307 |

OTHER PUBLICATIONS

Lee et al., A Characterization of the Thermal Parameters of Thermally Driven Polysilicon Microbridge Actuators Using Electrical Impedance Analysis, Sensors and Actuators, 75, pp. 86–92, Jul. 1999.

Lai et al., Optimization and Performance of High–Resolution Micro–Optomechanical Thermal Sensors, Sensors and Actuators, A 58, pp. 113–119, Jul. 1997.

Klaassen et al., Micromachined Thermally Isolated Circuits, TRF, Solid–State Sensor and Actuator Workshop, Jun. 2–6, pp. 127–131 Jun. 1996.

* cited by examiner

*Primary Examiner*—Thomas M. Dougherty
(74) *Attorney, Agent, or Firm*—Myers Bigel Sibley & Sajovec

(57) ABSTRACT

Microelectromechanical structures include a microelectronic substrate and spaced apart supports on the microelectronic substrate. A beam extends between the spaced apart supports and expands upon application of heat thereto, to thereby cause displacement of the beam between the spaced apart supports. The application of heat to the beam creates a thermal conduction path from the beam through the spaced apart supports and into the substrate. A thermal isolation structure in the heat conduction path reduces thermal conduction from the beam, through the spaced apart supports and into the substrate, compared to absence of the thermal isolation structure. The thermal isolation structure preferably has lower thermal conductivity than the beam and the supports. The heat that remains in the beam thereby can be increased. The thermal isolation structure may include a thermally insulating structure at each end of the beam, a thermally insulating structure in each spaced apart support, a thermally insulating structure in the substrate adjacent each spaced apart support, and/or at least one thermally insulating structure in the beam. Accordingly, improved thermal efficiency for microelectromechanical structures may be provided, to thereby allow lower power, higher deflection, larger force and/or higher speed.

40 Claims, 7 Drawing Sheets

US 6,262,512 B1

THERMALLY ACTUATED MICROELECTROMECHANICAL SYSTEMS INCLUDING THERMAL ISOLATION STRUCTURES

FIELD OF THE INVENTION

This invention relates to electromechanical systems, and more particularly to microelectromechanical systems.

BACKGROUND OF THE INVENTION

Microelectromechanical systems (MEMS) have been developed as alternatives to conventional electromechanical devices, such as relays, actuators, valves and sensors. MEMS devices are potentially low-cost devices, due to the use of microelectronic fabrication techniques. New functionality also may be provided, because MEMS devices can be much smaller than conventional electromechanical devices.

A major breakthrough in MEMS devices is described in U.S. Pat. No. 5,909,078 entitled Thermal Arched Beam Microelectromechanical Actuators to Wood et al., the disclosure of which is hereby incorporated herein by reference. Disclosed is a family of thermal arched beam microelectromechanical actuators that includes an arched beam which extends between spaced apart supports on a microelectronic substrate. The arched beam expands upon application of heat thereto. Means are provided for applying heat to the arched beam to cause further arching of the beam as a result of thermal expansion thereof, to thereby cause displacement of the arched beam.

When used as a microelectromechanical actuator, thermal expansion of the arched beam can create relatively large displacement and relatively large forces while consuming reasonable power. A coupler can be used to mechanically couple multiple arched beams. Thermal arched beams can be used to provide actuators, relays, sensors, microvalves and other MEMS devices. Other thermal arched beam microelectromechanical devices and associated fabrication methods are described in U.S. Pat. No. 5,994,816 to Dhuler et al. entitled Thermal Arched Beam Microelectromechanical Devices and Associated Fabrication Methods, the disclosure of which is hereby incorporated herein by reference.

Notwithstanding the above-described advances, there continues to be a need to further increase the thermal efficiency of MEMS devices. By increasing the thermal efficiency of MEMS devices, lower power, larger deflection, higher forces and/or higher speed operations may be provided.

SUMMARY OF THE INVENTION

It therefore is an object of the present invention to provide improved microelectromechanical structures.

It is another object of the present invention to provide improved thermal arched beam microelectromechanical devices.

It is yet another object of the present invention to provide microelectromechanical devices that can have higher thermal efficiency.

It is still another object of the present invention to provide thermal arched beam devices that can have higher thermal efficiency.

These and other objects may be provided, according to the present invention, by microelectromechanical structures that include a microelectronic substrate, at least one support on the microelectronic substrate and a beam that extends from the at least one support and that expands upon application of heat thereto, to thereby cause displacement of the beam. Application of heat to the beam also creates a thermal conduction path from the beam, through the at least one support and into the substrate. A thermal isolation structure in the heat conduction path reduces thermal conduction from the beam through the at least one support and into the substrate, compared to absence of the thermal isolation structure. The thermal isolation structure preferably has lower thermal conductivity than the beam and the at least one support. The heat that remains in the beam thereby can be increased. Higher thermal efficiency may be obtained, to thereby obtain lower power, larger deflection, higher force and/or higher speed operation.

Microelectromechanical structures according to the present invention preferably comprise a microelectronic substrate and spaced apart supports on the microelectronic substrate. A beam extends between the spaced apart supports and expands upon application of heat thereto, to thereby cause displacement of the beam between the spaced apart supports. The application of heat to the beam creates a thermal conduction path from the beam through the spaced apart supports and into the substrate. A thermal isolation structure in the heat conduction path reduces thermal conduction from the beam, through the spaced apart supports and into the substrate, compared to absence of the thermal isolation structure. The thermal isolation structure preferably has lower thermal conductivity than the beam and the at least one support. The heat that remains in the beam thereby can be increased.

The thermal isolation structure may comprise a thermally insulating structure at each end of the beam, between the beam and the spaced apart supports, to thereby thermally isolate the beam from the supports and the substrate. Alternatively, or in addition, the thermal isolation structure may comprise a thermally insulating structure in each spaced apart support, between the beam and the substrate, to thereby thermally isolate the beam from at least a portion of the supports and from the substrate. Alternatively, or in addition, the thermal isolation structure may comprise a thermally insulating structure in the substrate adjacent each spaced apart support, to thereby thermally isolate the beam and the supports from at least a portion of the substrate. Alternatively, or in addition, the thermal isolation structure can include at least one thermally insulating structure in the beam, to thermally isolate a portion of the beam from remaining portions of the beam, from the supports and from the substrate.

The beam may be heated externally by an external heater, or internally by passing current through the beam. When current is passed through the beam, and the thermal isolation structure includes a thermally insulating structure at each end of the beam, an electrically conductive structure also may be provided on each of the thermally insulating structures, to provide an electrically conductive path from the beam to the spaced apart supports. A thermally insulating structure in each spaced apart support may be provided when it is difficult to thermally isolate a portion of the beam. For example, when the beam comprises metal, a silicon nitride tether may be provided in each spaced apart support, between the metal beam and the substrate. Finally, a thermally insulating structure in the substrate may comprise an insulator-containing trench, such as an oxide-filled trench, in the substrate beneath each spaced apart support.

In all of the above embodiments, a trench also may be provided in the microelectronic substrate beneath the beam, to provide increased spacing between the beam and the surface of the substrate beneath the beam. The heat that remains in the beam thereby may be increased by providing an increased air gap between the beam and the substrate, to thereby allow reduced thermal conduction and/or convection directly from the beam to the substrate through the air gap.

Microelectromechanical structures according to the present invention preferably are employed with thermal arched beams as described in the above-cited U.S. patents, that comprise an arched beam that is arched in a predetermined direction and that further arches in the predetermined direction upon application of heat thereto. The predetermined direction preferably extends generally parallel to the face of the microelectronic substrate. A valve plate, coupler, capacitor plate, relay contact and/or other structure may be mechanically coupled to the thermal arched beam, for example as described in the above-cited patents.

One preferred embodiment of microelectromechanical structures according to the present invention includes an arched silicon beam that extends between spaced apart supports on a microelectronic substrate. The arched silicon beam is arched in a predetermined direction and further arches in the predetermined direction upon application of heat thereto, to thereby cause displacement of the arched silicon beam in the predetermined direction. A silicon dioxide link is provided at each end of the arched silicon beam, between the arched silicon beam and the spaced apart supports. An electrically conductive structure preferably is provided on each of the silicon dioxide links, to provide an electrically conductive path from the arched silicon beam to the spaced apart supports. The silicon dioxide link preferably is fabricated by thermally oxidizing the ends of the arched silicon beam. The electrically conductive structure may be provided by forming a metal film on the silicon dioxide link, that electrically connects the arched silicon beam to the spaced apart supports.

In another preferred embodiment, an arched metal beam extends between the spaced apart supports. A silicon nitride or other thermally insulating tether is provided in each spaced apart support, between the arched metal beam and the substrate, since it may be difficult to provide a thermally insulating link in the arched metal beam itself. An electrically conductive structure may be provided on each of the silicon nitride tethers, to provide an electrically conductive path from the arched metal beam to the spaced apart support. The electrically conductive structure preferably comprises a metal film on the silicon nitride tether that electrically connects the arched metal beam to the spaced apart supports.

In another preferred embodiment of the present invention, an arched metal beam is provided and an insulator-containing trench is provided in the substrate beneath each spaced apart support. The insulator-containing trench preferably comprises an oxide-filled trench in the substrate between each spaced apart support. Thus, where it is desirable to provide the metal beam and the spaced apart supports as one continuous metal structure, an insulator-containing trench in the substrate beneath each spaced apart support can reduce the thermal conduction from the continuous metal beam and spaced apart supports into the substrate, to thereby allow increased heat to remain in the beam.

The present invention also may be used with other thermally actuated beams such as cantilever beams and/or bimorphs that extend from a support on a microelectronic substrate, and that expand upon application of heat thereto, to thereby cause displacement of at least part of the beam.

A thermal isolation structure in the thermal conduction path from the beam through the support and into the substrate, can increase the heat that remains in the beam. As was described above, thermally insulating structures may be placed at the end of the beam adjacent the support, in the support, in the substrate and/or in an intermediate portion of the beam. Electrically conductive links and/or trenches in the substrate beneath the beam also may be provided. Accordingly, improved thermal efficiency for microelectromechanical structures may be provided, to thereby allow lower power, larger deflection, higher force and/or higher speed.

DETAILED DESCRIPTION OF PREFERRED EMBODIMENTS

Figure 1A:
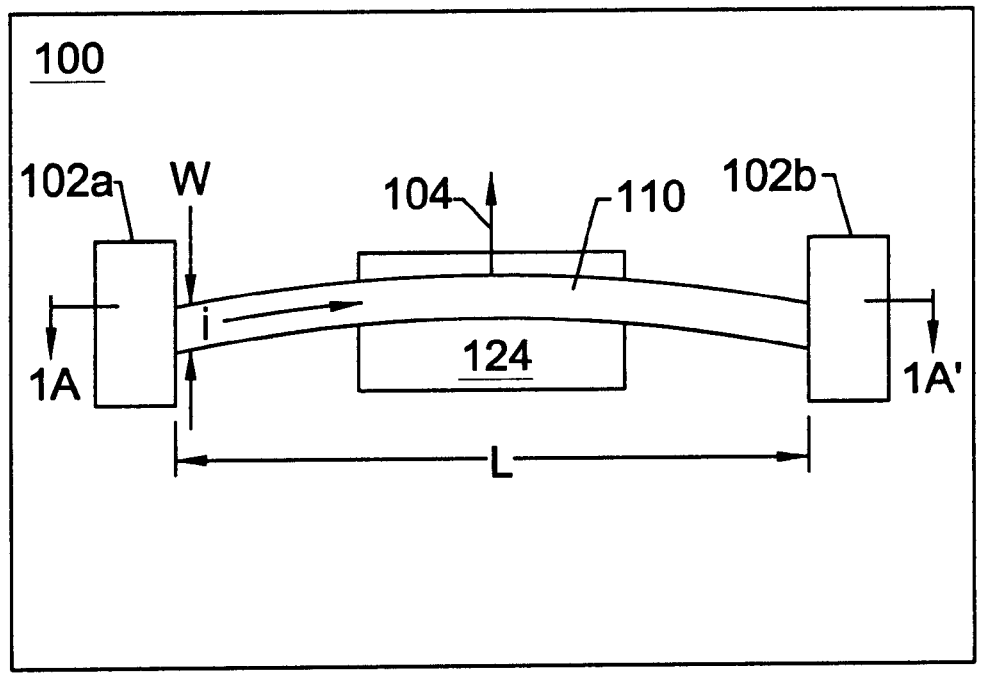
FIGS. 1A and 2A and FIGS. 1B and 2B are top views and side cross-sectional views, respectively, of thermal arched beam MEMS devices including thermal conduction paths.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present. Also, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1B:
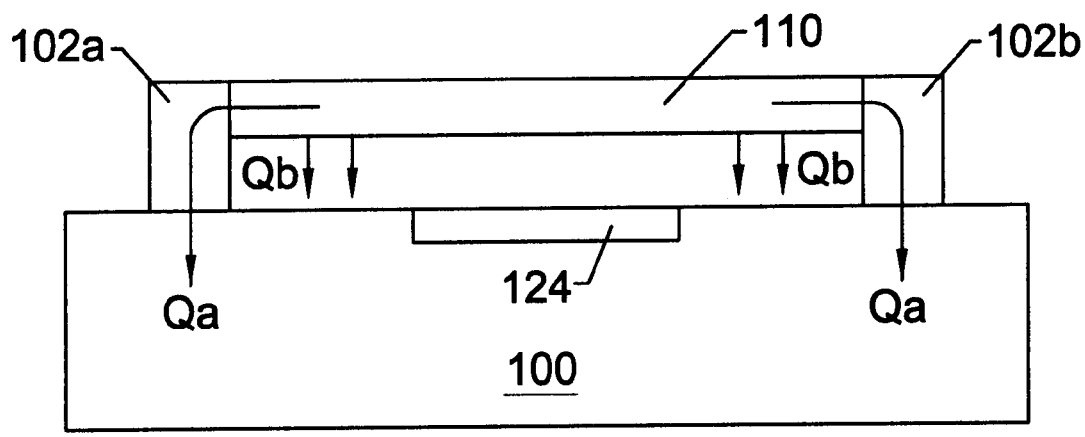
Figure 1C:
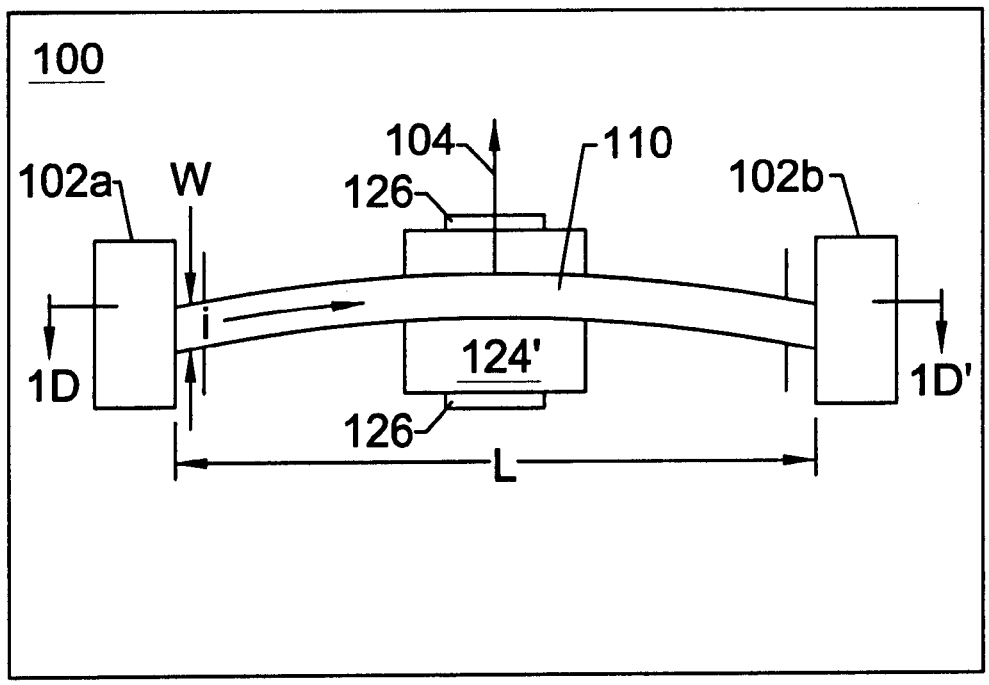
FIGS. 1C and 1D are top and side cross-sectional views, respectively, of thermal arched beam MEMS devices including thermal conduction paths.

FIGS. 1A and 1B are top and side cross-sectional views, respectively, that illustrate creation of thermal conduction paths in thermal arched beam MEMS actuators according to the present invention. According to the present invention, it has been realized that these thermal conduction paths can reduce the thermal efficiency of MEMS devices, and thereby increase the power and/or decrease the deflection, force and/or speed of operation thereof.

Referring now to FIGS. 1A and 1B, a thermal arched beam MEMS device includes a microelectronic substrate 100 and spaced apart supports 102a and 102b on the microelectronic substrate. An arched beam 110 of width W and length L extends between the spaced apart supports 102a and 102b. Multiple beams may be provided in all embodiments. The arched beam may be fabricated of metal, silicon or other material that has a positive coefficient of thermal expansion, so that it expands upon application of heat thereto. As shown in FIG. 1A, the arched beam is arched in a direction 104 that preferably extends parallel to the microelectronic substrate 100. Thus, upon application of heat thereto, further displacement of the beam 110 between the spaced apart supports 102a and 102b in the direction 104 is produced. Heat may be applied by passing a current i through the beam 110 and/or by means of an external heater 124. The heater 124 may be adjacent the substrate 100 as shown in FIGS. 1A and 1B or may be a floating heater 124' that is spaced apart from the substrate 124 and anchored thereto by heater anchors 126. The design and operation of thermal arched beams are described in the above-cited U.S. patents and need not be described in detail herein.

Figure 1D:
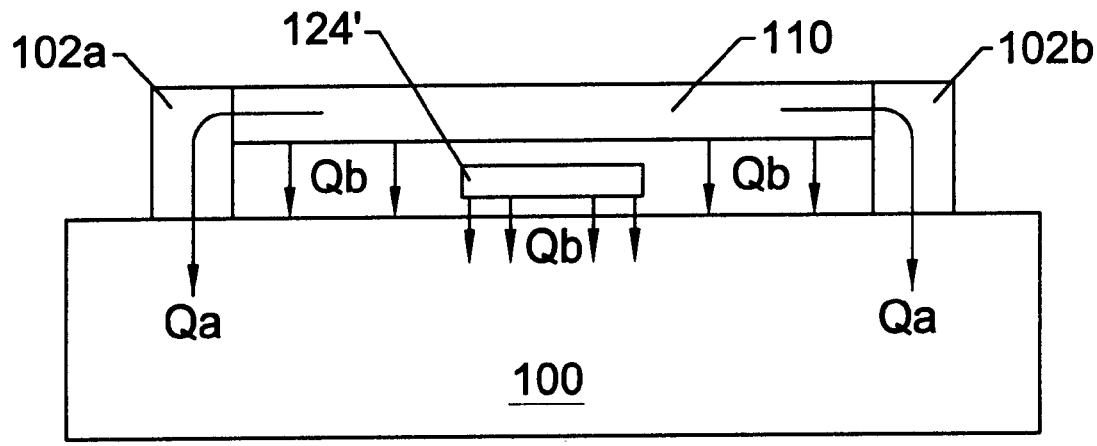

As shown in FIGS. 1B and 1D, two thermal paths are created upon application of heat to the beam. A first thermal conduction path Qa extends from the beam 110 through the spaced apart supports 102a and 102b and into the substrate 100. In FIG. 1B, a second thermal convection path Qb extends from the beam 110 through the air gap between the beam 110 and the substrate 100 and into the substrate 100. In FIG. 1D, the second thermal conduction path Qb extends from the heater 124' and into the substrate 100 and from the beam 110 into the substrate. These thermal paths can increase the power that is used to power the actuator, and/or reduce the deflection, force and/or speed of operation thereof.

According to the invention, at least one thermal isolation structure is provided in the first thermal conduction path Qa, that reduces thermal conduction from the beam 110, through the spaced apart supports 102a and 102b and into the substrate 100, and thereby can increase the heat that remains in the beam 110. In addition or alternatively, at least one thermal isolation structure may be provided in the second thermal convection path Qb that reduces thermal conduction from the beam through the air gap between the beam 110 and the substrate 100 and into the substrate. The thermal isolation structure preferably has lower thermal conductivity than the beam 110 and the spaced apart supports 102a and 102b.

In general, most of the heat may be lost through the supports 102a and 102b in the first thermal conductive path Qa compared to through the second thermal convection path Qb. In other words, Qa generally is greater than Qb for geometries that generally are used. Moreover, the thermal arched beams may be fabricated of nickel, silicon and/or other materials with high thermal expansion coefficient. They also may have high thermal conductivity. Thus, increasing the beam length L may improve the thermal efficiency somewhat.

Figure 2A:
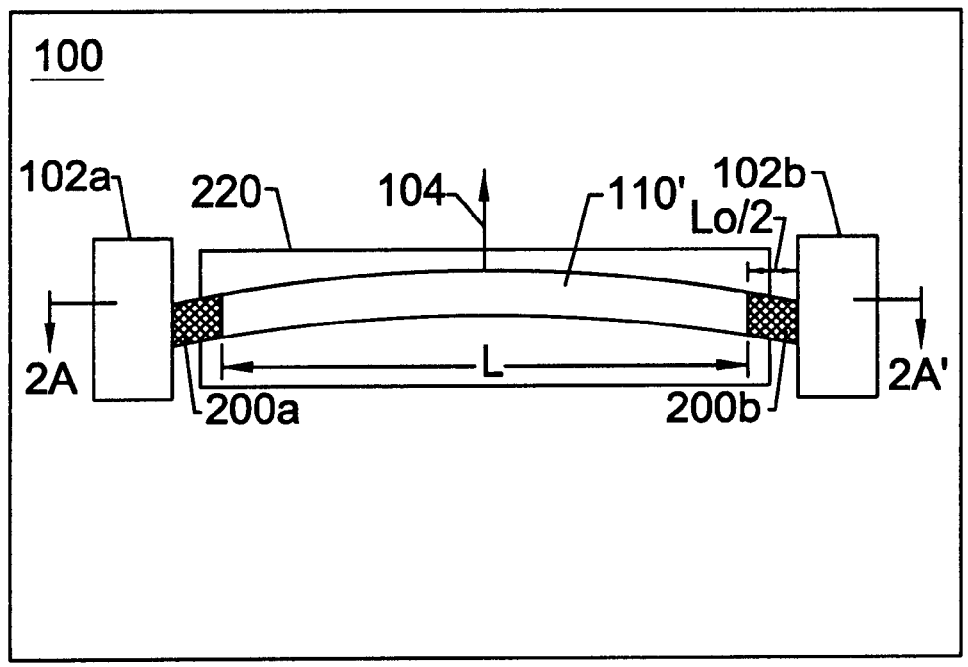
Figure 2B:
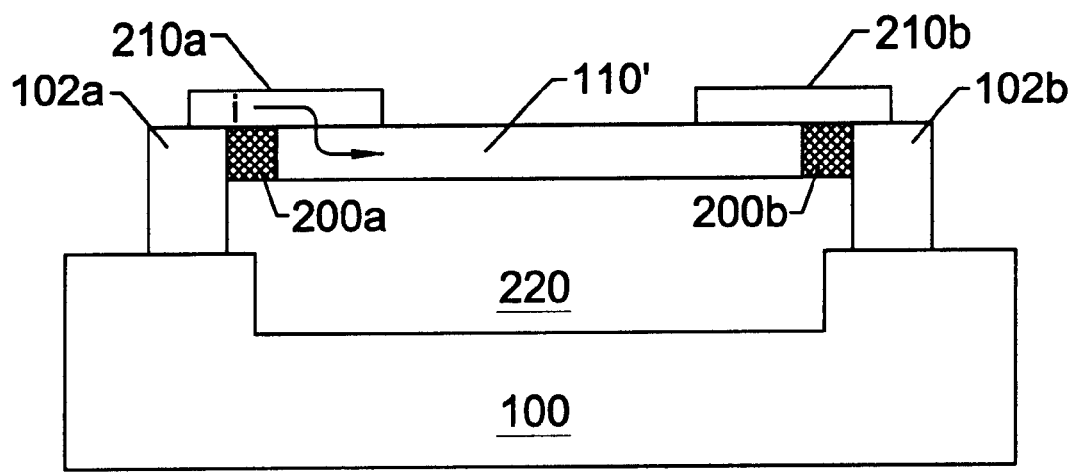

FIGS. 2A and 2B are top and side cross-sectional views of first embodiments of MEMS structures according to the present invention. As shown in FIGS. 2A and 2B, a thermally insulating structure, such as thermal isolation links 200a and 200b, is included at each end of the beam 110'. The thermal isolation links 200a, 200b reduce thermal conduction from the beam 110' through the spaced apart supports 102a, 102b and into the substrate 110a, to thereby allow increased heat to remain in the beam. The thermal isolation links 200a and 200b preferably have lower thermal conductivity than the beam 110' and the spaced apart supports 102a and 102b.

In a preferred embodiment, the thermal arched beam 110' comprises silicon and the thermal isolation links 200a and 200b may be fabricated by thermally oxidizing end portions of the beam 110', to thereby create silicon dioxide links at each end of the arched silicon beam, between the arched silicon beam and the spaced apart supports. Thermal oxidation may be obtained by masking the beam to expose the ends thereof, and then thermally oxidizing using conventional techniques. It will be understood, however, that the thermal isolation links 200a and 200b may comprise other materials that provide thermal isolation between the beam 110' and the spaced apart support 102a and 102b.

The thermal conductivity of silicon dioxide is approximately 1.4 W/m° K and is much smaller than the thermal conductivity of silicon (150 W/m° K). Thus, by providing silicon dioxide thermal isolation links 200a, 200b of length $L_0/2$ and a silicon beam 110' of length L, a thermal equivalent to a silicon beam of length $L+L_0(150/1.4) \approx L+107\ L_0$ may be provided. Accordingly, improved isolation may be provided.

As was described above, in some embodiments, it may be desirable to heat the beam 110 by passing a current i therethrough. In this case, it may be desirable to provide an electrically conductive structure, such as conductive links 210a and 210b, on the respective thermal isolation links 200a and 200b, to thereby electrically connect the beam 110' with the supports 102a and 102b. The conductive structures 210a and 210b may be provided by a metal film on the thermal isolation links 200a, 200b. Although the conductive links are shown above the beam, other locations may be used. The conductive links 210a and 210b may increase the thermal conduction in the thermal conduction path Qa somewhat. However, since the conductive structures may be provided by thin metal films, minimal increase in the thermal conduction path Qa may be obtained.

It will be understood that portions of the beam 110' and supports 102a, 102b also may be metallized and that one continuous metallization layer may stretch from the supports, onto the thermal isolation links 200a' and the beam 110'. Accordingly, as shown in FIG. 2B, a current i may pass through the beam 110' from the supports 102a and 102b, notwithstanding the presence of the thermal isolating links 200a, 200b. Thus, thermal conduction in path Qa may be reduced. It also will be understood that if the beam 110' carries an electrical signal, the electrically conductive structure may be provided, even though indirect heating may be employed.

Figure 2C:
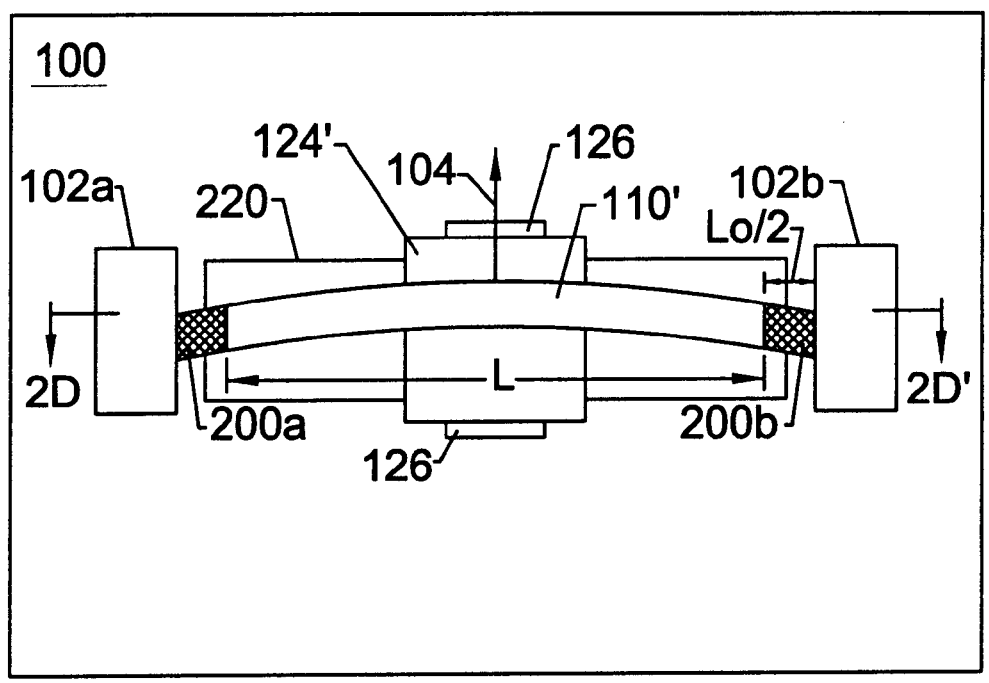
FIGS. 2C, 2D, 3A, 3B, 4A, 4B, 5A and 5B are top and side cross-sectional views, respectively, of embodiments of thermal arched beam MEMS devices according to the present invention.
Figure 2D:
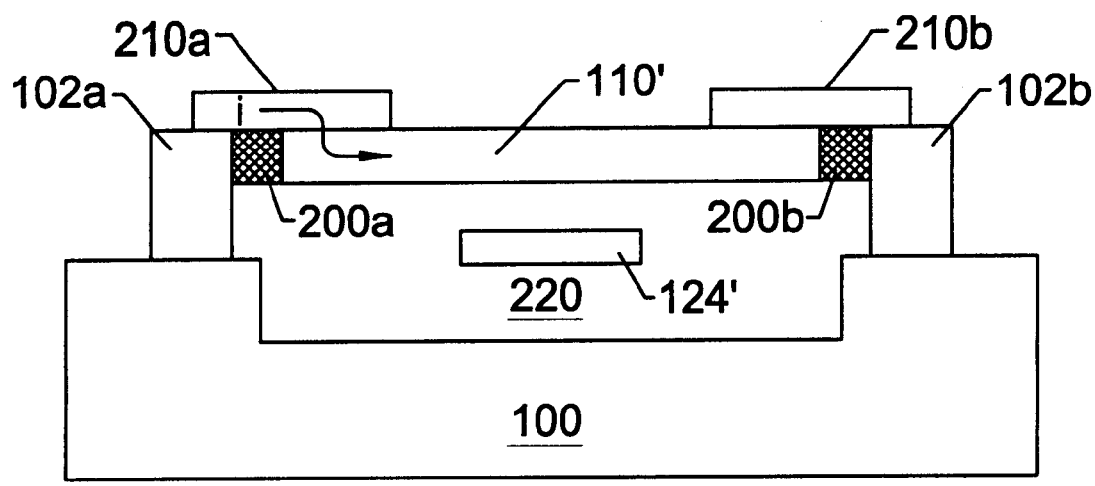

Still referring to FIGS. 2A and 2B, an optional trench 220 may be formed in the substrate 100 beneath the beam 110', to provide increased spacing between the beam 110' and the surface of the substrate 100 beneath the beam. The thermal convection in path Qb thereby may be reduced, to thereby allow increased heat to remain in the beam. The trench 220 may be used in a self-heated beam, wherein a current i is passed through the beam. It also may be used in an embodiment where the beam is heated indirectly by a heater 124' that is spaced apart from the substrate 100 as shown in FIGS. 2C and 2D. It will be understood that the trench 220 may be used independent of the thermal isolation links 200a and 200b.

Figure 3A:
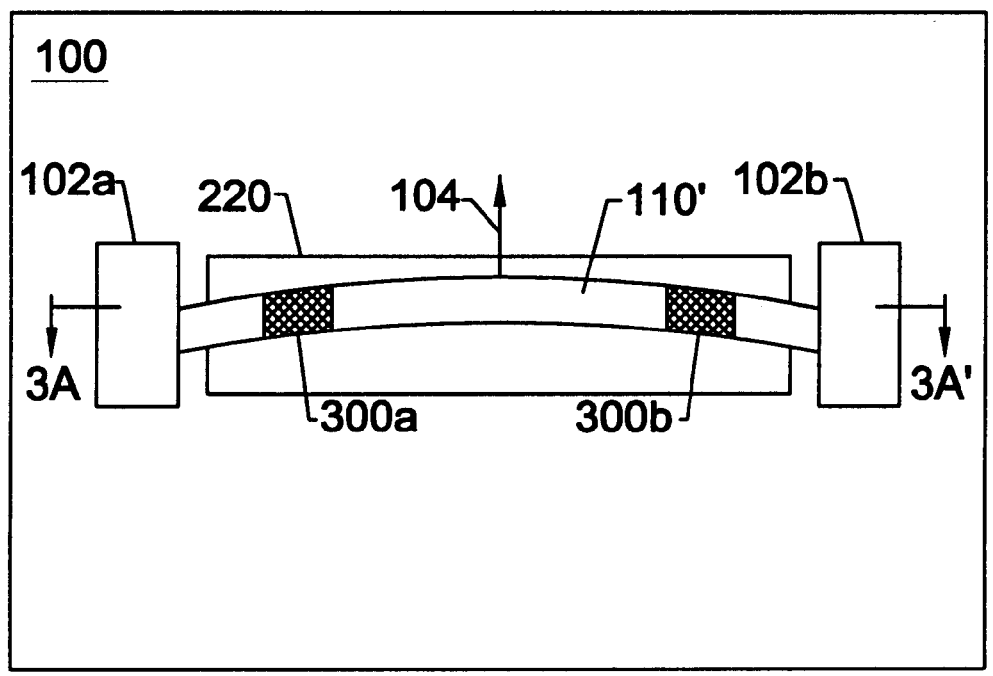
Figure 3B:
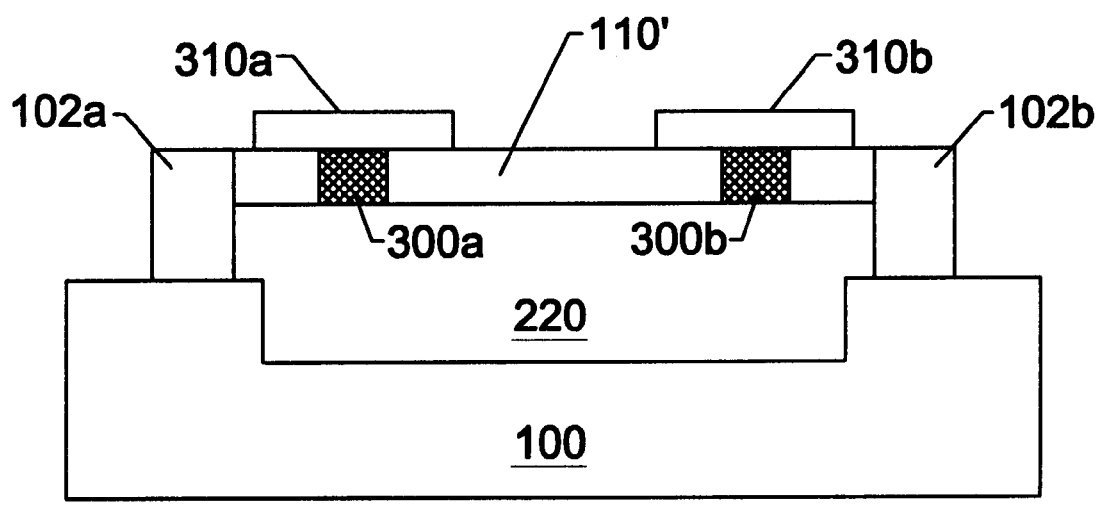

It also will be understood that the thermal isolation links 200a, 200b need not be provided at the ends of the beam 110'. Thus, as shown in FIGS. 3A and 3B, thermal isolation links 300a and 300b may be provided at intermediate portions of the beam 110, to isolate at least a first portion of the beam from remaining portions of the beam. The thermal isolation links 300a and 300b preferably have lower thermal conductivity than the beam 110' and the spaced apart supports 102a and 102b. An electrically conductive structure 310a, 310b also may be provided to allow a current to pass across the thermal isolation links 300a, 300b. Indirect heating also may be provided.

Figure 4A:
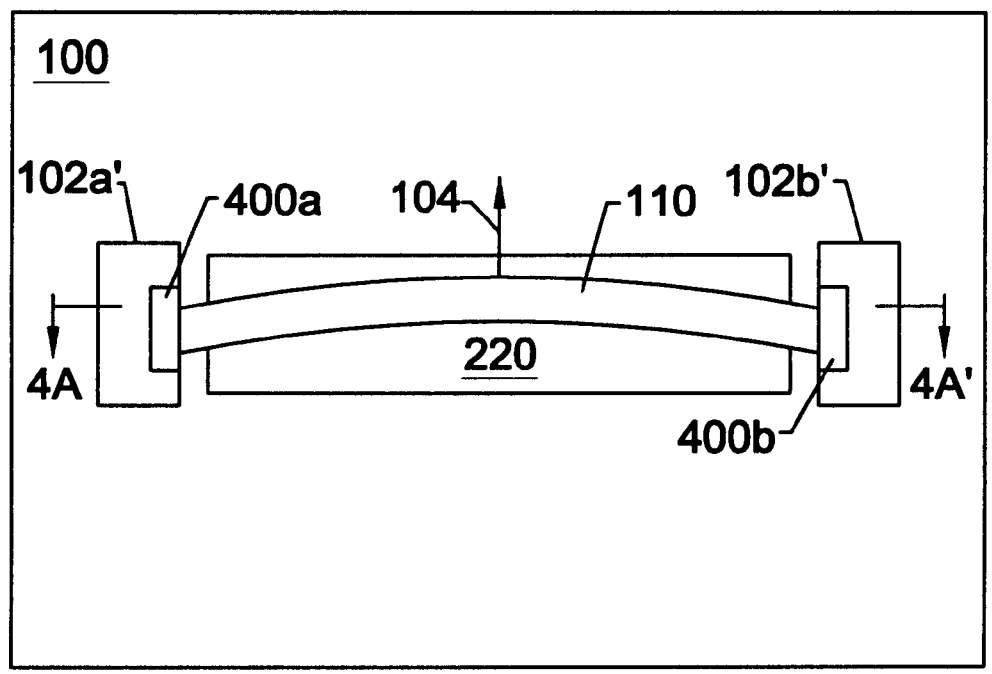
Figure 4B:
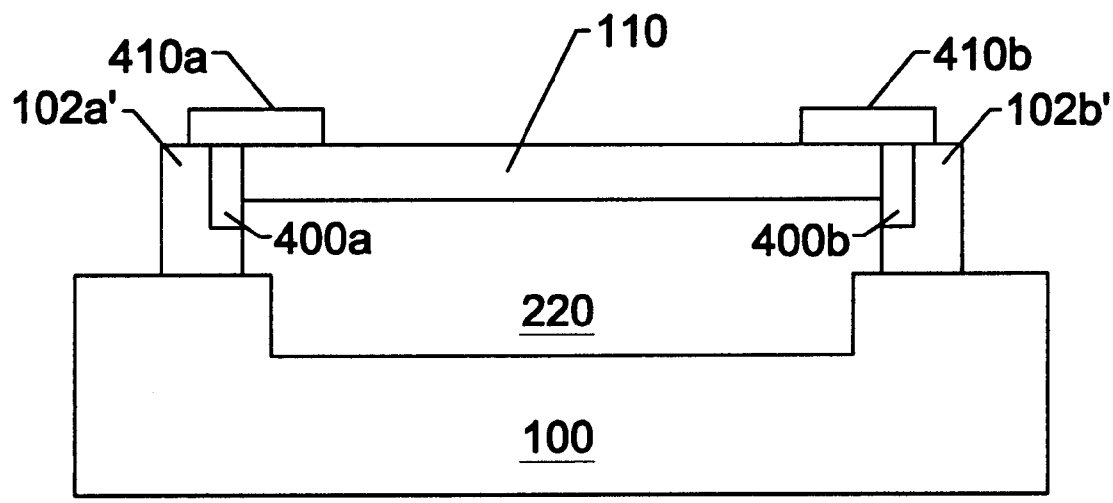

FIGS. 4A and 4B illustrate other embodiments of the present invention. As shown in FIGS. 4A and 4B, thermally insulating structures 400a and 400b are provided in each spaced apart support, to thermally isolate the beam 110 from at least a portion of the supports 102a' and 102b' and from the substrate 100. These embodiments preferably may be utilized when the beam 110 comprises nickel or other metal that is not readily oxidized in contrast with silicon. Accordingly, thermally insulating structures 400a and 400b may be provided in the respective spaced apart supports 102a' and 102b'. For example, silicon nitride tethers may be provided. In this regard, the thermally insulating tethers 400a and 400b in the spaced apart supports 102a' and 102b' also may be located on the surface of the spaced apart supports 102a', 102b', between the supports 102a', 102b' and the beam 110. The thermal insulating structures 400a and 400b preferably have lower thermal conductivity than the beam 100 and the spaced apart support 102a and 102b'. When the beam 110 is directly heated by passing a current therethrough, an electrically conductive structure 410a and 410b may be provided across the respective thermally insulating structure 400a and 400b to allow current to pass from the support 102a, 102b to the beam 110. Also, when direct heating is provided by passing current through beam 110, a trench 220 may be provided in the substrate 110, as was described above. When indirect heating is provided for the beam 110, electrically conductive structures 410a and 410b may be eliminated, but the trench 220 may be provided.

Figure 5A:
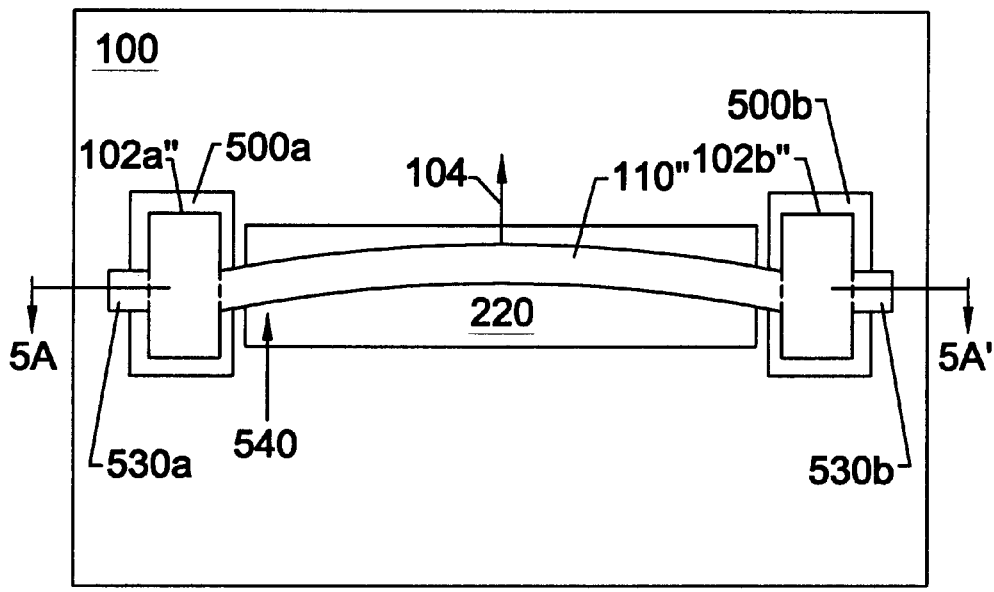
Figure 5B:
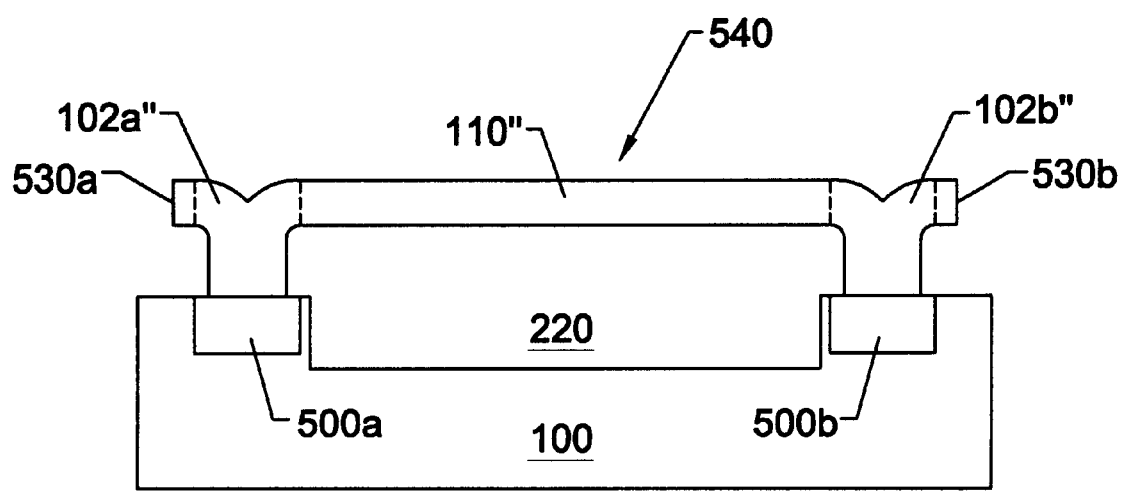

FIGS. 5A and 5B are top and side cross-sectional views of yet other embodiments of the present invention. As shown in FIGS. 5A and 5B, a monolithic structure 540, such as a monolithic nickel structure, may provide the beam 110", the spaced apart supports 102a" and 102b" and conductive connectors 530a and 530b for the microelectromechanical structure. When a monolithic structure 540 is provided, it may be difficult to provide thermally isolating links within the beam or between the beam and the supports. Accordingly, as shown in FIGS. 5A and 5B, a thermally insulating structure 500a and 500b is included in the substrate 100 adjacent each respectively spaced apart support 102a" and 102b", to thereby thermally isolate the beam 110" and the supports 102a" and 102b" from at least a portion of the substrate 100. The thermal insulating structures 500a and 500b preferably have lower thermal conductivity than the beam 110" and the spaced apart supports 102a" and 102b".

In a preferred embodiment, the thermally insulating structures 500a, 500b in the substrate comprise a thermal insulator-containing trench in the substrate beneath each spaced apart support. More preferably, the thermal insulator-containing trench comprises a silicon dioxide-filled trench in the substrate beneath each spaced apart support. The trench may be about 20 $\mu$m deep. Thermal efficiency of directly or indirectly heated beams thereby may be increased. When direct heating is used, a trench 220 also may be provided in the substrate 100 as was already described. The thermally isolating links, conductive structures and silicon dioxide-filled trenches may be fabricated using conventional MEMS fabrication processes.

It will be understood by those having skill in the art that the thermal isolation structures of FIGS. 2A–2B, 3A–3B, 4A–4B and 5A–5B may be used in combination, to provide enhanced thermal isolation in various MEMS structures. Subcombinations of these thermal isolation structures also may be used. For example, FIGS. 2A–2B and 5A–5B may be combined to provide a thermal insulating link at each end of an arched beam and an insulator-containing trench in the substrate beneath each spaced apart support. The beam may comprise high thermal expansion material, such as nickel, silicon, gold, other materials and combinations of materials. The thermally isolating link may comprise silicon dioxide, silicon nitride, organic dielectrics, other materials and combinations thereof. The thermal isolation trench may comprise silicon dioxide, silicon nitride, organic dielectrics, other materials and combinations thereof. For direct heating with an isolated support and beam, it may be preferred for the beam to include a high resistivity material. A thin metal film can be formed on the thermal isolating link for electrical connection, as was described above.

Thermal isolation structures according to the present invention may be integrated into existing MEMS fabrication processes, such as the well known LIGA and MUMPS fabrication processes. Moreover, thermal isolation structures according to the present invention may be used for thermal beams that are not arched and also may be used for cantilever beams such as bimorph beams, that are supported at a single end thereof. Stated differently, one of the supports of FIGS. 2A–5B may be eliminated. As is well known to those having skill in the art, in any of these embodiments, the beam may be coupled to a valve plate, capacitor plate, mirror, relay contact, coupler and/or other structure, such as was described in the above-cited U.S. patents. Moreover, multiple beams may be coupled together to provide increased force and/or increased efficiency. Thermal isolation structures according to the present invention thereby can provide higher thermal efficiency microelectromechanical structures, to thereby allow reduced power, larger deflection, higher force and/or higher speed of operation.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A microelectromechanical structure comprising:
   a microelectronic substrate;
   a support on the microelectronic substrate;
   a beam that extends from the support and that expands upon application of heat thereto to thereby cause displacement of at least part of the beam, the application of heat to the beam creating a thermal conduction path from the beam, through the support and into the substrate; and
   a thermal isolation structure in the thermal conduction path that reduces thermal conduction from the beam, through the support and into the substrate;
   wherein the thermal isolation structure comprises a thermally insulating structure in the substrate adjacent the support, to thereby thermally isolate the beam and the support from at least a portion of the substrate; and
   wherein the thermal isolation structure comprises an oxide filled trench in the substrate beneath the support.

2. A microelectromechanical structure comprising:
   a microelectronic substrate;
   a support on the microelectronic substrate;
   a beam that extends from the support and that expands upon application of heat thereto to thereby cause displacement of at least part of the beam, the application of heat to the beam creating a thermal conduction path from the beam, through the support and into the substrate;
   a thermal isolation structure in the thermal conduction path that reduces thermal conduction from the beam, through the support and into the substrate, wherein the thermal isolation structure comprises a thermally insulating structure in the support, between the beam and the substrate, to thereby thermally isolate the beam from at least a portion of the support and from the substrate; and wherein the beam comprises metal and wherein the thermal isolation structure comprises a silicon nitride tether in the support, between the metal beam and the substrate.

3. A microelectromechanical structure comprising:

a microelectronic substrate;

a support on the microelectronic substrate;

a beam that extends from the support and that expands upon application of heat thereto to thereby cause displacement of at least part of the beam, the application of heat to the beam creating a thermal conduction path from the beam, through the support and into the substrate;

a thermal isolation structure in the thermal conduction path that reduces thermal conduction from the beam, through the support and into the substrate, wherein the thermal isolation structure comprises a thermally insulating structure at the end of the beam adjacent the support, to thereby thermally isolate the beam from the support and the substrate; and wherein the beam comprises silicon and wherein the thermally insulating structure at the end of the beam comprises silicon dioxide.

4. A microelectromechanical structure comprising:

a microelectronic substrate;

spaced apart supports on the microelectronic substrate;

a beam that extends between the spaced apart supports and that expands upon application of heat thereto to thereby cause displacement of the beam between the spaced apart supports, the application of heat to the beam creating a thermal conduction path from the beam, through the spaced apart supports and into the substrate; and a thermal isolation structure in the thermal conduction path that reduces thermal conduction from the beam, through the spaced apart supports and into the substrate;

wherein the thermal isolation structure comprises a solid thermally insulating structure in the substrate adjacent each spaced apart support, to thermally isolate the beam and the supports from at least a portion of the substrate.

5. A microelectromechanical structure comprising:

a microelectronic substrate;

spaced apart supports on the microelectronic substrate;

a beam that extends between the spaced apart supports and that expands upon application of heat thereto to thereby cause displacement of the beam between the spaced apart supports, the application of heat to the beam creating a thermal conduction path from the beam, through the spaced apart supports and into the substrate; and a thermal isolation structure in the thermal conduction path that reduces thermal conduction from the beam, through the spaced apart supports and into the substrate;

wherein the thermal isolation structure comprises at least one thermally insulating structure in the beam, to thermally isolate a portion of the beam from remaining portions of the beam, from the supports and from the substrate.

6. A microelectromechanical structure according to claim 5 wherein the thermal isolation structure has lower thermal conductivity than the beam and the spaced apart supports.

7. A microelectromechanical structure comprising:

a microelectronic substrate;

spaced apart supports on the microelectronic substrate;

a beam that extends between the spaced apart supports and that expands upon application of heat thereto to thereby cause displacement of the beam between the spaced apart supports, the application of heat to the beam creating a thermal conduction path from the beam, through the spaced apart supports and into the substrate;

a thermal isolation structure in the thermal conduction path that reduces thermal conduction from the beam, through the spaced apart supports and into the substrate, wherein the thermal isolation structure comprises a thermally insulating structure at each end of the beam, between the beam and the spaced apart supports, to thermally isolate the beam from the supports and the substrate; and an electrically conductive structure on each of the thermally insulating structures to provide an electrically conductive path from the beam to the spaced apart supports.

8. A microelectromechanical structure comprising:

a microelectronic substrate;

spaced apart supports on the microelectronic substrate;

a beam that extends between the spaced apart supports and that expands upon application of heat thereto to thereby cause displacement of the beam between the spaced apart supports, the application of heat to the beam creating a thermal conduction path from the beam, through the spaced apart supports and into the substrate; and a thermal isolation structure in the thermal conduction path that reduces thermal conduction from the beam, through the spaced apart supports and into the substrate, wherein the thermal isolation structure comprises a thermally insulating structure at each end of the beam, between the beam and the spaced apart supports, to thermally isolate the beam from the supports and the substrate;

wherein the beam comprises silicon and wherein the thermally insulating structure at each end of the beam comprises silicon dioxide.

9. A microelectromechanical structure comprising:

a microelectronic substrate;

spaced apart supports on the microelectronic substrate;

a beam that extends between the spaced apart supports and that expands upon application of heat thereto to thereby cause displacement of the beam between the spaced apart supports, the application of heat to the beam creating a thermal conduction path from the beam, through the spaced apart supports and into the substrate; and a thermal isolation structure in the thermal conduction path that reduces thermal conduction from the beam, through the spaced apart supports and into the substrate, wherein the thermal isolation structure comprises a thermally insulating structure in each spaced apart support, between the beam and the substrate, to thermally isolate the beam from at least a portion of the supports and from the substrate;

wherein the beam comprises metal and wherein the thermally insulating structure comprises a silicon nitride tether in each spaced apart support, between the metal beam and the substrate.

10. A microelectromechanical structure comprising:

a microelectronic substrate;

spaced apart supports on the microelectronic substrate;

a beam that extends between the spaced apart supports and that expands upon application of heat thereto to thereby cause displacement of the beam between the spaced apart supports, the application of heat to the beam creating a thermal conduction path from the beam, through the spaced apart supports and into the substrate; and a thermal isolation structure in the thermal conduction path that reduces thermal conduction from the beam, through the spaced apart supports and into the substrate;

wherein the thermal isolation structure comprises a thermally insulating structure in the substrate adjacent each spaced apart support, to thermally isolate the beam and the supports from at least a portion of the substrate; and wherein the thermally insulating structure comprises an oxide filled trench in the substrate beneath each spaced apart support.

11. A microelectromechanical structure comprising:

a microelectronic substrate;

spaced apart supports on the microelectronic substrate;

a beam that extends between the spaced apart supports and that expands upon application of heat thereto to thereby cause displacement of the beam between the spaced apart supports, the application of heat to the beam creating a thermal conduction path from the beam, through the spaced apart supports and into the substrate;

a thermal isolation structure in the thermal conduction path that reduces thermal conduction from the beam, through the spaced apart supports and into the substrate; and a trench in the microelectronic substrate beneath the beam to increase spacing between the beam and the surface of the substrate beneath the beam.

12. A microelectromechanical structure according to claim 5 wherein the beam comprises an arched beam that is arched in a predetermined direction and that further arches in the predetermined direction upon application of heat thereto.

13. A microelectromechanical structure according to claim 5 further comprising at least one of a valve plate, a coupler, a relay contact and a capacitor plate that is mechanically coupled to the beam.

14. A microelectromechanical structure comprising:

a microelectronic substrate;

a support on the microelectronic substrate;

a beam that extends from the support and that expands upon application of heat thereto to thereby cause displacement of at least part of the beam, the application of heat to the beam creating a thermal conduction path from the beam, through the support and into the substrate; and a thermal isolation structure in the thermal conduction path that reduces thermal conduction from the beam, through the support and into the substrate;

wherein the thermal isolation structure comprises a solid thermally insulating structure in the substrate adjacent the support, to thereby thermally isolate the beam and the support from at least a portion of the substrate.

15. A microelectromechanical structure comprising:

a microelectronic substrate;

a beam that expands upon application of heat thereto to thereby cause displacement thereof;

means for supporting the beam in spaced apart relation from the microelectronic substrate;

means for reducing thermal conduction from the beam, through the means for supporting and into the substrate upon application of heat to the beam; and means for providing an electrically conductive path from the ends of the beam to the means for supporting.

16. A microelectromechanical structure comprising:

a microelectronic substrate;

a support on the microelectronic substrate;

a beam that extends from the support and that expands upon application of heat thereto to thereby cause displacement of at least part of the beam, the application of heat to the beam creating a thermal conduction path from the beam, through the support and into the substrate; and a thermal isolation structure in the thermal conduction path that reduces thermal conduction from the beam, through the support and into the substrate;

wherein the thermal isolation structure comprises at least one thermally insulating structure in the beam, to thereby thermally isolate a portion of the beam from remaining portions of the beam, from the support and from the substrate.

17. A microelectromechanical structure comprising:

a microelectronic substrate;

a beam that expands upon application of heat thereto to thereby cause displacement thereof;

means for supporting the beam in spaced apart relation from the microelectronic substrate; and means for reducing thermal conduction from the beam, through the means for supporting and into the substrate upon application of heat to the beam;

wherein the means for reducing comprises means for reducing thermal conduction between the means for supporting and the substrate, to thermally isolate the beam and the means for supporting from at least a portion of the substrate.

18. A microelectromechanical structure comprising:

a microelectronic substrate;

a beam that expands upon application of heat thereto to thereby cause displacement thereof;

means for supporting the beam in spaced apart relation from the microelectronic substrate; and means for reducing thermal conduction from the beam, through the means for supporting and into the substrate upon application of heat to the beam;

wherein the means for reducing comprises means for reducing thermal conduction from a first portion of the beam to a second portion of the beam, to thermally isolate the first portion of the beam from the second portion of the beam, from the means for supporting and from the substrate.

19. A microelectromechanical structure accordingly to claim 18 wherein the means for reducing has lower thermal conductivity than the beam and the means for supporting.

20. A microelectromechanical structure according to claim 18 further comprising means for mechanically coupling the beam to at least one of a valve plate, a coupler, a relay contact and a capacitor plate.

21. A microelectromechanical structure according to claim 18 wherein the beam comprises an arched beam that is arched in a predetermined direction and that further arches in the predetermined direction upon application of heat thereto.

22. A microelectromechanical structure according to claim 16 wherein the thermal isolation structure has lower thermal conductivity than the beam and the support.

23. A microelectromechanical structure comprising:

a microelectronic substrate;

spaced apart supports on the microelectronic substrate;

an arched silicon beam that extends between the spaced apart supports, that is arched in a predetermined direction and that further arches in the predetermined direction upon application of heat thereto to thereby cause displacement of the arched silicon beam in the predetermined direction; and a silicon dioxide link at each end of the arched silicon beam, between the arched silicon beam and the spaced apart supports.

24. A microelectromechanical structure according to claim 23 further comprising:

an electrically conductive structure on each of the silicon dioxide links to provide an electrically conductive path from the arched silicon beam to the spaced apart supports.

25. A microelectromechanical structure according to claim 23 wherein the silicon dioxide link is a thermal oxide link.

26. A microelectromechanical structure according to claim 24 wherein the electrically conductive structure comprises a metal film on the silicon dioxide link that electrically connects the arched silicon beam to the spaced apart supports.

27. A microelectromechanical structure according to claim 23 further comprising:

a trench in the microelectronic substrate beneath the arched silicon beam to provide increased spacing between the arched silicon beam and the surface of the substrate beneath the arched silicon beam.

28. A microelectromechanical structure according to claim 23 further comprising at least one of a valve plate, a coupler, a relay contact and a capacitor plate that is mechanically coupled to the arched silicon beam.

29. A microelectromechanical structure according to claim 16 further comprising:

a trench in the microelectronic substrate beneath the beam to increase spacing between the beam and the surface of the substrate beneath the beam.

30. A microelectromechanical structure comprising:

a microelectronic substrate;

spaced apart supports on the microelectronic substrate;

an arched metal beam that extends between the spaced apart supports, that is arched in a predetermined direction and that further arches in the predetermined direction upon application of heat thereto to thereby cause displacement of the arched metal beam in the predetermined direction;

a tether in each spaced apart support, between the arched metal beam and the substrate; and an electrically conductive structure on each of the tethers to provide an electrically conductive path from the arched metal beam to the spaced apart supports.

31. A microelectromechanical structure according to claim 30 wherein the electrically conductive structure comprises a metal film on the tether that electrically connects the arched metal beam to the spaced apart supports.

32. A microelectromechanical structure according to claim 30 further comprising:

a trench in the microelectronic substrate beneath the arched metal beam to provide increased spacing between the arched metal beam and the surface of the substrate beneath the arched metal beam.

33. A microelectromechanical structure according to claim 30 further comprising at least one of a valve plate, a coupler, a relay contact and a capacitor plate that is mechanically coupled to the arched metal beam.

34. A microelectromechanical structure comprising:

a microelectronic substrate;

spaced apart supports on the microelectronic substrate;

a metal beam that extends between the spaced apart supports, that is arched in a predetermined direction and that further arches in the predetermined direction upon application of heat thereto to thereby cause displacement of the arched beam in the predetermined direction; and an insulator-containing trench in the substrate beneath each spaced apart support.

35. A microelectromechanical structure according to claim 34 wherein the insulator-containing trench comprises an oxide-filled trench in the substrate beneath each spaced apart support.

36. A microelectromechanical structure according to claim 34 further comprising:

a trench in the microelectronic substrate beneath the metal beam to provide increased spacing between the metal beam and the surface of the substrate beneath the metal beam.

37. A microelectromechanical structure according to claim 35 further comprising at least one of a valve plate, a coupler, a relay contact and a capacitor plate that is mechanically coupled to the metal beam.

38. A microelectromechanical structure according to claim 34 wherein the metal beam comprises an arched metal beam that is arched in a predetermined direction and that further arches in the predetermined direction upon application of heat thereto.

39. A microelectromechanical structure according to claim 16 further comprising at least one of a valve plate, a coupler, a relay contact and a capacitor plate that is mechanically coupled to the beam, opposite the support.

40. A microelectromechanical structure comprising:

a microelectronic substrate;

a support on the microelectronic substrate;

a beam that extends from the support and that expands upon application of heat thereto to thereby cause displacement of at least part of the beam, the application of heat to the beam creating a thermal conduction path from the beam, through the support and into the substrate;

a thermal isolation structure in the thermal conduction path that reduces thermal conduction from the beam, through the support and into the substrate, wherein the thermal isolation structure comprises a thermally insulating structure at the end of the beam adjacent the support, to thereby thermally isolate the beam from the support and the substrate; and an electrically conductive structure on the thermally insulating structure to provide an electrically conductive path from the beam to the support.

* * * * *